United States Patent
Suzuki et al.

[11] Patent Number: 5,852,335
[45] Date of Patent: Dec. 22, 1998

[54] STATOR STRUCTURE FOR ROTARY ELECTRIC MACHINE

[75] Inventors: Yuzuru Suzuki, Shizuoka; Sakae Fujitani, Hamakita, both of Japan

[73] Assignee: Mineba Ceo., Ltd., Nagano, Japan

[21] Appl. No.: 960,080

[22] Filed: Oct. 24, 1997

Related U.S. Application Data

[63] Continuation of Ser. No. 638,923, Apr. 25, 1996, abandoned.

[30] Foreign Application Priority Data

Apr. 26, 1995 [JP] Japan .................................. 7-102433

[51] Int. Cl.$^6$ ........................... H02K 29/06; H02K 15/82
[52] U.S. Cl. ........................... 310/254; 310/71; 310/194; 310/258
[58] Field of Search ................................... 310/254, 194, 310/258, 71, 43, 179; 360/98.07, 99.04, 99.08

[56] References Cited

U.S. PATENT DOCUMENTS

| | | | |
|---|---|---|---|
| 3,737,693 | 6/1973 | Mishima | 310/67 |
| 4,182,026 | 1/1980 | Searle | 29/596 |
| 4,454,554 | 6/1984 | Coleman | 361/41 |
| 4,695,419 | 9/1987 | Inariba | 264/259 |
| 4,712,035 | 12/1987 | Forbes et al. | 310/269 |
| 4,720,646 | 1/1988 | Torimoto | 310/71 |
| 4,769,900 | 9/1988 | Morinaga et al. | 29/606 |
| 4,818,919 | 4/1989 | Taguchi et al. | 310/254 |
| 4,879,486 | 11/1989 | Yumiyama | 310/254 |
| 4,891,567 | 1/1990 | Fujitani et al. | 318/254 |
| 4,958,099 | 9/1990 | Chigira et al. | 310/254 |
| 5,057,732 | 10/1991 | Fukaya | 310/208 |
| 5,073,735 | 12/1991 | Takagi | 310/71 |
| 5,264,816 | 11/1993 | Degenhart et al. | 336/192 |
| 5,275,141 | 1/1994 | Tsunoda et al. | 123/399 |
| 5,442,247 | 8/1995 | Suzuki et al. | 310/67 R |
| 5,508,578 | 4/1996 | Suzuki et al. | 310/254 |
| 5,523,634 | 6/1996 | Takahashi et al. | 310/49 A |
| 5,541,461 | 7/1996 | Joseph | 310/71 |
| 5,570,503 | 11/1996 | Stokes | 29/596 |
| 5,691,584 | 11/1997 | Toida et al. | 310/67 R |

FOREIGN PATENT DOCUMENTS

| | | | |
|---|---|---|---|
| 0 433 479 | 6/1991 | European Pat. Off. | 310/51 |
| 0 556 914 | 8/1993 | European Pat. Off. | |
| 2 386 928 | 3/1978 | France | 310/156 |
| 2593974 | 8/1987 | France | |
| 61-58456 | 3/1986 | Japan | 310/51 |

OTHER PUBLICATIONS

Patent Abstracts of Japan, vol. 11, No. 55 (Feb. 20, 1987).
Patent Abstracts of Japan, vol. 9, No. 318 (Dec. 13, 1985).
Patent Abstracts of Japan, vol. 17, No. 593 (Oct. 28, 1993).

*Primary Examiner*—Thomas M. Dougherty
*Assistant Examiner*—Tran N. Nguyen
*Attorney, Agent, or Firm*—Staas & Halsey

[57] ABSTRACT

This invention is to provide a stator structure for a rotary electric machine comprising poles of an armature core made of soft magnetic material and bobbins wound with coils at the respective poles and inserted into the poles in which the bobbin wound with the coils are mounted at the stator poles without decreasing motor characteristics. The material of a collar part (auxiliary pole tooth or extrapolation pole tooth) of a bobbin opposed to a rotor is formed of resin filled with soft magnetic material to improve the characteristics of a rotary electric machine. It is also effective to form the end of the collar part of the bobbin of a ferromagnetic material. Since a magnetic flux is also passed through the auxiliary pole tooth or the extrapolation pole tooth provided at the bobbin, the magnetic reluctance of the magnetic path to the rotary pole can be reduced. Further, the surface of the auxiliary pole tooth opposed to the rotary pole is formed in an arc shape along the inner periphery of the rotary pole, and a gap between the rotary pole and the auxiliary pole tooth is controlled.

10 Claims, 6 Drawing Sheets

Characteristic of R.P.M -LOAD/CURRENT-LOAD (Prior-Art)

Characteristic of R.P.M -LOAD/CURRENT-LOAD (This Invention)

STATOR STRUCTURE FOR ROTARY ELECTRIC MACHINE

This application is a continuation of application Ser. No. 08/638,923, filed Apr. 25,1996, now abandoned.

BACKGROUND OF THE INVENTION

1. Field of the Invention

This invention relates to a stator for a rotary electric machine having a structure in which a bobbin wound with a coil is inserted into the pole of the stator. And more particularly, the invention relates to an improvement in the magnetic characteristics of a stator for a rotary electric machine or a motor.

2. Description of the Prior Art

In a floppy disk drive used, for example, for an auxiliary memory of a personal computer, an outer rotor type brushless DC motor formed flatly to drive the floppy disk is used. In the outer rotor type brushless DC motor of this type, the poles of a stator radially protrude from a rotational shaft as a center, and pole teeth are extended from the ends of the poles oppositely to a rotor magnet in the rotating direction of the rotor magnet. Since the pole is formed in a T shape, the winding part of its stator coil can be formed in a slender shape, but a bobbin cannot be inserted into the pole of the stator. Therefore, the coil is directly wound on the pole of the stator, and hence many human hours have been required for this work. Further, if even one slot is failed at the time of winding the coil, the entire stator structure becomes improper, and hence it causes its yield to be decreased.

In order to avoid the above-mentioned inconvenience, the conventional method has employed the steps of removing each pole tooth from the end of the pole of the stator, forming the pole in a rod shape, winding coils on a bobbin in the separate step to form a stator coil, and then inserting the bobbin of the stator coil into the respective pole of the stator.

In the manufacturing steps of a motor, the winding step throws away a long time, and hence it is required to improve of the winding step. The bobbin having the stator coil on it is inserted into the pole. When this method is applied to the manufacturing steps of a motor, the process of the manufacturing steps of a motor will be more improved. However, since the bobbin must be inserted from the end side of the pole of the stator, i.e., the side of the rotor opposed to the rotor magnet, the tooth crest (pole tooth) of the stator pole must be formed the same as or smaller than the inner diameter of the bobbin. As a result, it is natural that the pole tooth opposed to the rotor magnet of the pole is narrowed, the capturing ratio of the magnetic flux from a field magnet is reduced thereby to decrease a magnetic efficiency, and hence the motor characteristics are inconveniently diminished.

SUMMARY OF THE INVENTION

This invention contemplates to be devised in view of the above-described circumstances, and an object of this invention is to provide a stator structure for a rotary electric machine comprising poles of an armature core made of soft magnetic material and bobbins wound with coils and inserted into the poles, wherein the bobbin wound with the coils can be mounted in the stator poles without decreasing motor characteristics.

When the winding is formed in the bobbin shape, the cause for decreasing motor characteristics is the reduction in the tooth crest width (pole tooth width) for inserting the bobbin. As a result that, to cover the reduction in the pole tooth width, the material of the collar part (auxiliary pole tooth or extrapolation pole tooth) of the bobbin opposed to a rotor is formed of resin in which soft magnetic material is filled, the winding can be formed in the bobbin shape without decreasing the motor characteristics.

As the other method for this remedy, it is also effective to form the bobbin of conventional resin (PA, etc.) and to add the extrapolation pole tooth formed of ferromagnetic material to the end face (flange) of the bobbin by means such as insert molding, etc.

Since a magnetic flux is passed through the auxiliary pole tooth or the extrapolation pole tooth provided at the bobbin, magnetic reluctance of a magnetic path to a rotary pole can be reduced. Further, the surface of the auxiliary pole tooth opposed to the rotary pole is formed in an arc shape along the inner periphery of the rotary pole, and a gap between the rotary pole and the auxiliary pole tooth is controlled with respect to the rotating direction (the improving effect of a cogging torque/torque ripple is obtained by changing the gap).

DESCRIPTION OF THE PREFERRED EMBODIMENTS

Figure 1:
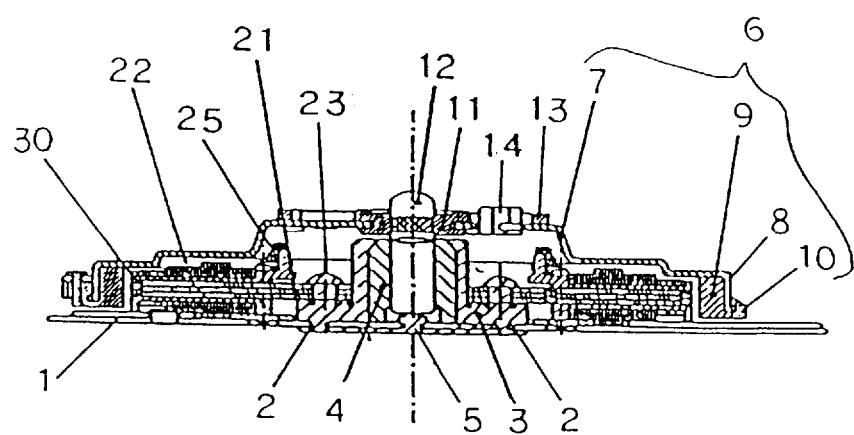
FIG. 1 is a sectional view showing an embodiment of this invention.

An embodiment of this invention will be described in detail with reference to the accompanying drawings. FIG. 1 is a sectional view showing the state that a rotor is rotatably provided on a board in which a stator section is mounted and a printed circuit board is provided. In FIG. 1, numeral 1 denotes a board for forming a spindle motor, which is formed of soft magnetic material such as iron. A plurality of holes 2 is perforated at the board 1. A stationary base 3 made of synthetic resin is fixed by injection molding with the holes 2 as mounting parts. A cylindrical bearing cylinder 4 is fixed to the center of the stationary base 3. A pivot 5 for supporting the bottom of the rotational shaft 12 to be described later is provided at the bottom of the bearing cylinder 4. Numeral 7 designates a rotary disk for forming a rotor and rotating a floppy disk to be formed in a thin circular tray shape. A rotary pole 9 made of a ring-shaped permanent magnet is fixed inside the outer periphery 8 of the rotary disk 7. A speed detecting permanent magnet 10 for detecting the rotating speed of the rotary disk 7 is fixed to the lower part of the outer periphery 8 of the rotary disk 7. The rotary pole 9 made of the permanent magnet is formed of rare earth metal to be for med in a ring shape. A plurality of permanent magnets is formed at the rotary pole 9 by magnetizing. These permanent magnets are magnetized in the radial direction of the rotary pole 9. The directions of the polarities of the poles of the permanent magnets are opposite at the adjacent poles. A rotary disk 7 assembly including the rotary poles 9 constitutes a rotor 6. A rotational shaft mounting plate 11 made of metal is fixed to the center of the rotary disk 7, and a rotational shaft 12 is fixed to the center of the rotational shaft mounting plate 11. The rotational shaft 12 is rotatably supported to the cylindrical bearing cylinder 4.

Figure 2:
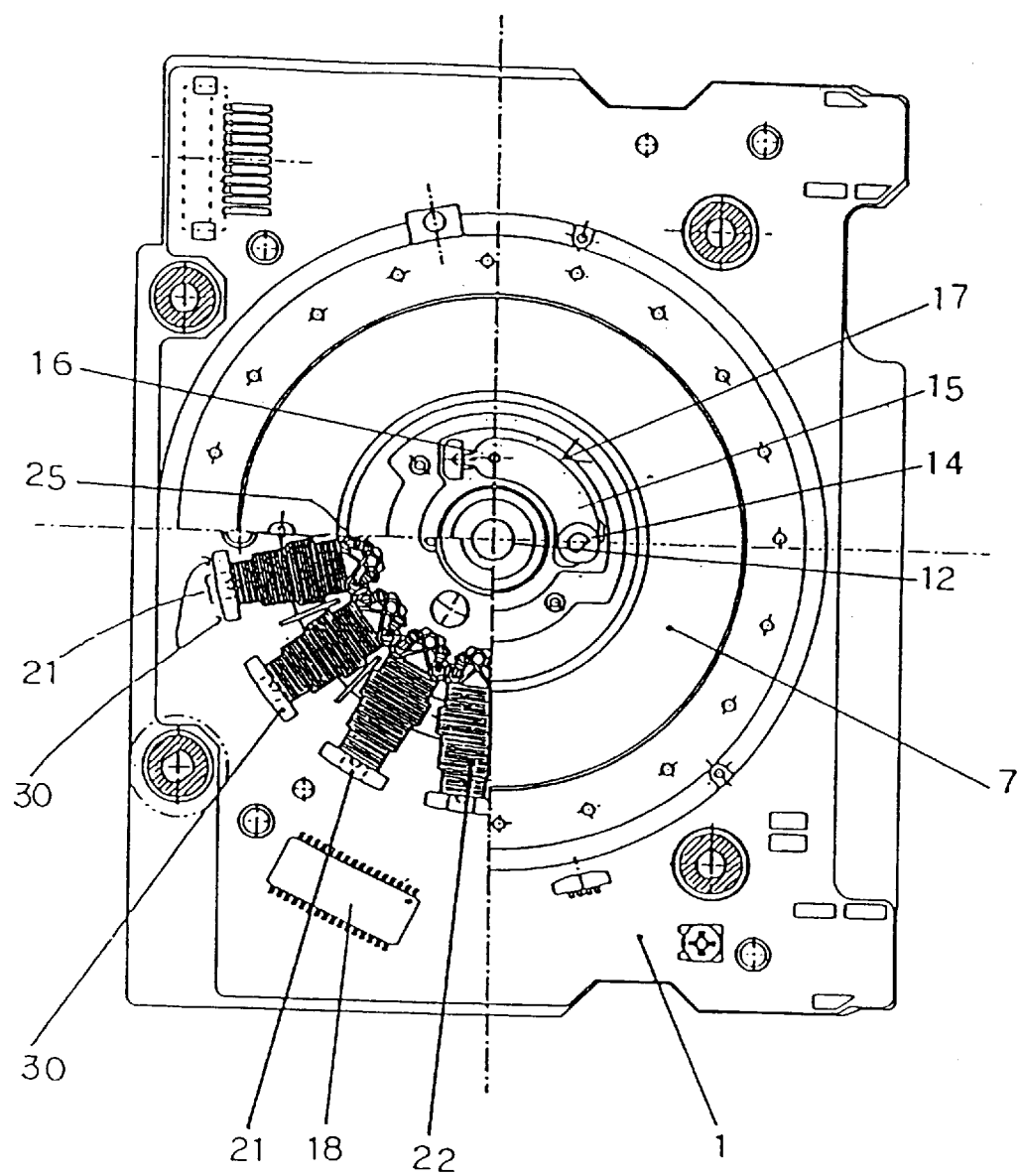
FIG. 2 is a front view showing an embodiment of this invention.

A hole 13 is opened at the rotary disk 7, and a drive pin 14 protrudes from the hole 13. As shown in FIG. 2, the drive pin 14 is fixed to the other end of a spring plate 15 fixed at its end to the rear surface of the rotary disk 7. The spring plate 15 has a mounting base part 16 and an arm part 17 continued to the base part 16, and the drive pin 14 is caulked to the end of the arm part 17. In FIG. 1, numeral 21 depicts a stator pole, and 22, a stator winding. The stator pole 21 is fixed to the board 1 by caulking a protrusion 23 protruding from the stationary base 3. Though not shown, a thin sheet-shaped attracting magnet is adhered to the surface of the rotary disk 7 at the rotational shaft 12 as a center. The attracting magnet attracts a soft iron plate provided at the center of the floppy disk to be rotatably driven and fixes the soft iron plate to the rotary disk 7. In FIGS. 1 and 2, numeral 25 indicates terminals provided at the stationary base 3.

Though no t shown, leads extended from the stator winding 22 are wound on the terminals 25 respectively. The terminals 25 are connected to a printed wiring formed on the surface of the board 1. Though not clearly shown, an insulating film is adhered on a soft iron plate of the board 1 for forming a printed circuit board, and an electric circuit is formed on the insulating film. Numeral 18 denotes a drive IC for driving a three-phase brushless DC motor provided on the board 1, which contains a speed servo controller in it.

Figure 3:
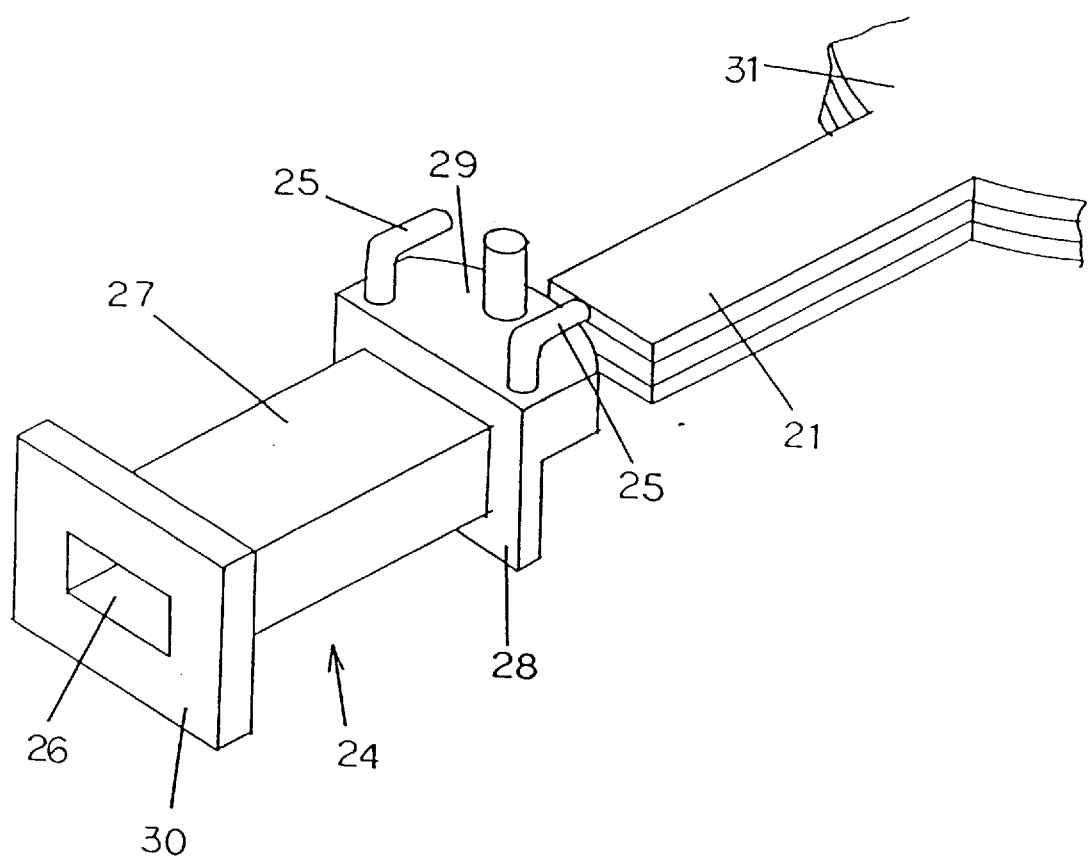
FIG. 3 is an exploded perspective view showing the state that a bobbin is drawn from a stator pole.

The structure of the stator winding 22 wound on the stator pole 21 will b e described in detail. FIG. 3 is an exploded perspective view showing the state that a bobbin 24 for forming the stator winding 21 is drawn from the stator pole 21. In FIG. 3, the winding is not wound on the bobbin 24. The bobbin 24 is formed of resin such as polyamide resin, etc., containing soft magnetic material of iron oxide such as Mn—Zn ferrite, etc. , and the detail will be described later. The bobbin 24 has a cylindrical body 27 having a hole 26 of a square sectional shape in which the stator pole 21 is passed through the center, a collar part 28 is formed at its one end of the body 27, and a terminal block 29 for holding the terminals 25 is provided on the upper surface of the collar part 28. An auxiliary pole 30 is provided at the other end of the bobbin 24. The auxiliary pole 30 is formed in a collar shape in such a manner that the area of the side face is formed much larger than that of the hole 26 in which the stator pole protruding from the yoke 31 is exposed.

Though not shown, a winding is wound on the bobbin 24, and the ends of the winding are wired to the terminals 25. The end side of the stator pole 21 is inserted into the central hole 26 of the bobbin 25, and forcibly inserted until the collar part 28 is arrived at the yoke 31 of the root of the stator pole 21 to be stopped. The end of the stator pole 21 is exposed from the end of the auxiliary pole tooth 30 in this state. The stator pole 21 assembled with the stator winding 22 wound on the bobbin 25 is fixed to the stationary base 3. Thereafter, the rotational shaft 12 of the rotor 6 for holding the rotary pole 9 multipolarly magnetized on the surface opposed to the outer periphery of the stator pole 21 is inserted into the bearing cylinder 4 to constitute an outer rotor type brushless DC motor.

In this case, the material of the soft magnetic material used for the bobbin 24 is mixed material of soft ferrite such as Mn—Zn, Ni—Zn, etc., and polymer material (e.g., PA) in such a manner that the content of the ferrite is 80 wt. % or more.

Figure 4:
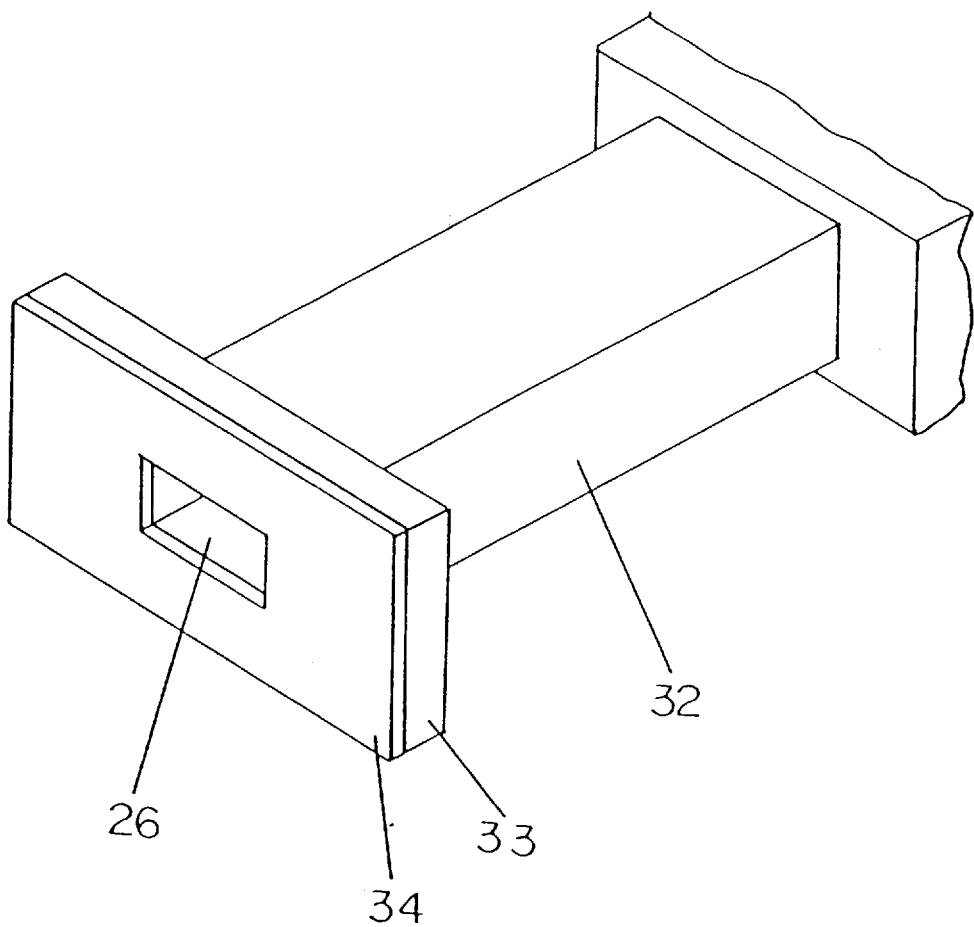
FIG. 4 is a partial perspective view showing another embodiment.

FIG. 4 is a view showing another embodiment of this invention. A bobbin 32 is formed not of resin filled with soft magnetic material, but of general purpose polymer material (PBT, PA, etc.). An extrapolation pole tooth 34 formed of ferromagnetic material such as a n iron plate at the flange 33 of the bobbin 32 is integrated with the bobbin 32 by insert molding. The mounting of the extrapolation pole tooth 34 at the bobbin 32 may be, in addition to the insert molding, fusion bonding or welding, adhering, etc.

Figure 5:
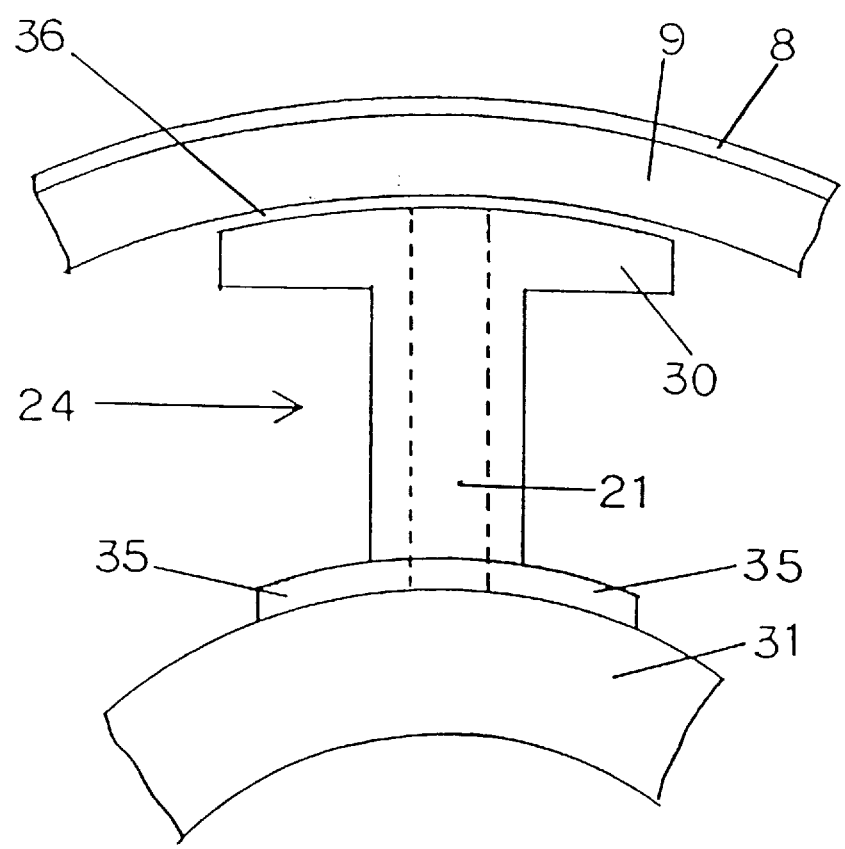
FIG. 5 is a partial front view showing still another embodiment.

In the two embodiments d e scribed above as shown in FIG. 5, t o reduce a gap 36 between the rotary pole 9 and the auxiliary pole tooth 30, it is preferable to form the surface of the auxiliary pole tooth 30 opposed to the rotary pole 9 in an arc shape along the inner periphery of the rotary pole 9. Further, when the bobbin itself is formed of resin filled with soft magnetic material, as shown in FIG. 5, is preferable to so provide a curvature at a collar part 35 as to closely contact with the sidewall of the yoke 31.

Figure 6A:
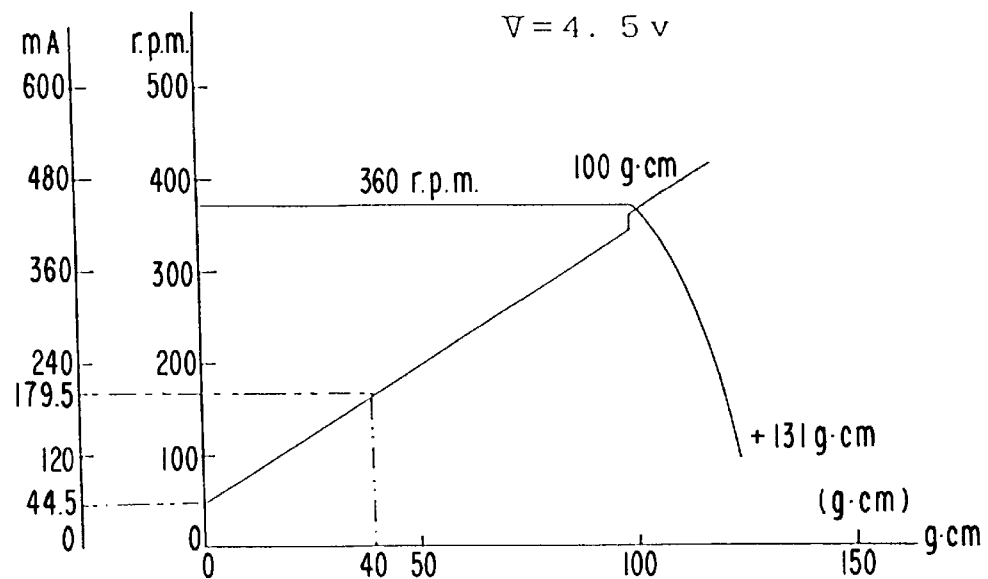
FIG. 6 is characteristic diagrams showing the characteristics of this invention and motor characteristics of conventional motor.
Figure 6B:
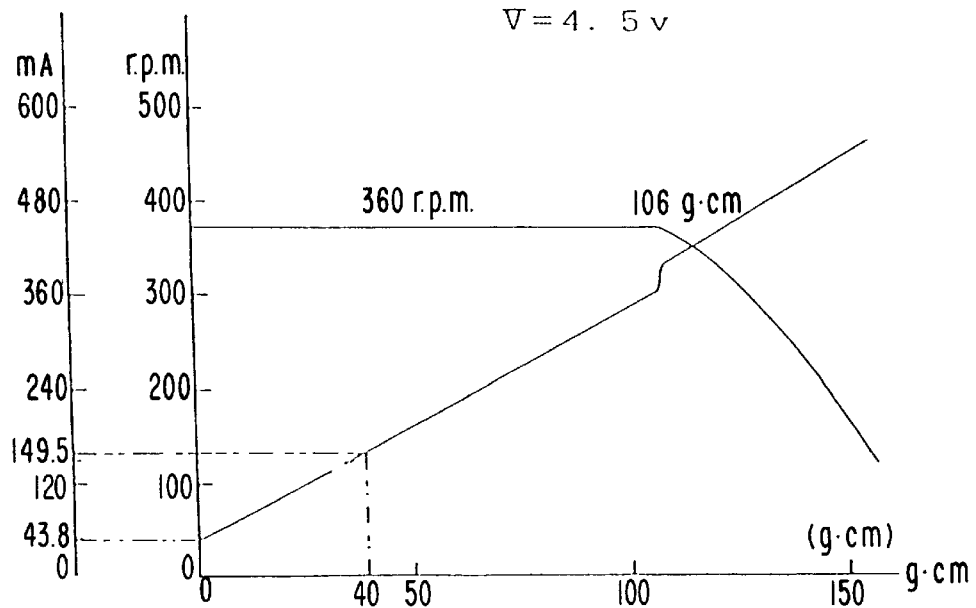

FIG. 6 shows the difference of the characteristics of this invention from conventional motor characteristics. As understood from FIG. 6, this invention remarkably improves the motor characteristics in such a manner that its torque constant is improved by about 28% (296.3 g-cm/A to 378.4 g-c m/A) and its servo torque range is improved by 6% (100 g-cm to 106 g-cm) by adding the auxiliary pole tooth 30 or the extrapolation pole tooth 34.

This invention can apparently be applied to not only all motors or generators in which the poles are formed by using the core of soft magnetic material despite the brushless DC motor, but also both inner rotor and outer rotor types.

According to this invention as described above, the number of turns of the stator winding can be further efficiently provided without decreasing the characteristics of the rotary electric machine. The structure of the rotary electric machine in which its yield can be improved can be provided. The cost of the rotary electric machine can be further reduced. Further, this invention has a merit of solely winding the bobbin with the winding.

What is claim is:

1. A motor structure for a rotary electric machine, comprising:
    a rotational shaft;
    a rotary disk connected to said rotational shaft having rotary poles consisting of a ring-shared permanent magnet;
    a ring-shaped yoke made of soft magnetic material disposed at a circumferential side of said rotational shaft;
    stator poles made of soft magnetic material radially extending from said ring-shaped yoke to outside said yoke, said stator poles having a unitary body and facing said rotary poles;
    a bobbin wound with windings such that the bobbin can be inserted with the windings into one of said stator poles;
    wherein, said bobbin has a collar part facing said ring-shaded permanent magnet rotary pole at one end thereof; and
    said collar part is formed of a material containing soft magnetic material; and
    the bobbin is provided with a pair of terminals for windings at an end thereof opposite the collar part.

2. A motor structure for a rotary electric machine according to claim 1, wherein the entire bobbin is formed of a material containing soft magnetic material.

3. A motor structure for a rotary electric machine according to claim 1 or 2, wherein a material containing soft magnetic material is synthetic resin such as polymer material.

4. A motor structure for a rotary electric machine according to claim 1 or 2, wherein said soft magnetic material contained in said collar part is soft ferrite such as iron oxide.

5. A motor structure for a rotary electric machine according to claim 1, wherein a surface of said one end of said collar part facing said ring-shaped permanent magnet rotary pole is formed in an arc shape along an arc shape of said rotary pole.

6. A motor structure for a rotary electric machine, comprising:

a rotational shaft;

stator poles made of soft magnetic material extending from a yoke in a perpendicular direction to said rotational shaft;

a rotary pole made of a ring-shaped permanent magnet surrounding said stator poles;

a bobbin wound with windings such that the bobbin can be inserted with the windings into one of said stator poles;

wherein, said bobbin has a collar part, formed of soft magnetic material facing said ring-shaped rotary pole at one end thereof;

an extrapolation pole tooth of ferromagnetic material fixed to a surface of said collar part facing said ring-shaped rotary pole; and the bobbin is provided with a pair of terminals for windings at an end thereof opposite the collar part.

7. A motor structure for a rotary electric machine according to claim 1, wherein said bobbin has, at another end thereof, another collar part to contact closely with said yoke, said another collar part having said pair of terminals for windings.

8. A motor structure for a rotary electric machine according to claim 7, wherein said bobbin is formed of polymer having no magnetic material therein.

9. A motor structure for a rotary electric machine according to claim 1, wherein said rotary electric machine is an outer rotor type brushless DC motor.

10. A motor structure for a rotary electric machine according to claim 9, wherein the entire bobbin is formed of a material containing soft magnetic material.

* * * * *

UNITED STATES PATENT AND TRADEMARK OFFICE
CERTIFICATE OF CORRECTION

PATENT NO.   : 5,852,335
DATED        : December 22, 1998
INVENTOR(S)  : Suzuki et al.

It is certified that error appears in the above-identified patent and that said Letters Patent is hereby corrected as shown below:

Title page, [73] Assignee, "Mineba Ceo.," should be --Minebea Co.,--;

Col. 2,   line 50, "is" should be --are--;

Col. 3,   line 24, "no t" should be --not--;
          line 35, "b e" should be --be--.

Col. 4,   line 8, "a n" should be --an--;
          line 13, "d c scribed" should be --described--;
          line 14, "t o" should be --to--;
          line 47, "ring-shared" should be --ring-shaped--.

Signed and Sealed this

Fourth Day of April, 2000

Attest:

Attesting Officer

Q. TODD DICKINSON

Director of Patents and Trademarks